United States Patent [19]
Vollerin

[11] 4,030,874
[45] June 21, 1977

[54] METHOD OF AND APPARATUS FOR CONTROLLING COMBUSTION

[75] Inventor: Bernard Vollerin, Geneva, Switzerland

[73] Assignee: Battelle Memorial Institute, Carouge, Geneva, Switzerland

[22] Filed: Apr. 22, 1976

[21] Appl. No.: 679,100

[30] Foreign Application Priority Data

Dec. 15, 1975 Switzerland ............... 16207/75

[52] U.S. Cl. ................ 431/9; 431/12; 431/19; 431/115
[51] Int. Cl.² ....................... F23M 9/00
[58] Field of Search ........... 431/9, 2, 12, 19, 115, 431/116

[56] References Cited
UNITED STATES PATENTS

| | | | |
|---|---|---|---|
| 2,217,518 | 10/1940 | Merkt | 431/9 X |
| 3,000,572 | 9/1961 | Sullivan | 431/19 X |
| 3,146,821 | 9/1964 | Wuetig | 431/9 X |

*Primary Examiner*—Edward G. Favors
*Attorney, Agent, or Firm*—Karl F. Ross; Herbert Dubno

[57] ABSTRACT

A liquid or gaseous (fluid) combustible is mixed with a combustion-sustaining gas and fed under pressure into a chamber where the mixture is burned. The mass flow of the combustible (fuel) is normally maintained constant for a combustion chamber of given thermal power output. The pressure in the chamber is continuously detected and the ratio of the mass flow of recirculated exhaust gas to the mass flow of the oxygen-containing gas (air or oxygen), which together constitute the combustion-sustaining gas, is increased when this pressure increases above a predetermined limit and the ratio is decreased when the pressure decreases below a predetermined limit. The ratio is varied by increasing or decreasing the proportion of exhaust gases and thereby decreasing or increasing, respectively, the partial pressure of oxygen in this combustion-sustaining gas.

10 Claims, 7 Drawing Figures

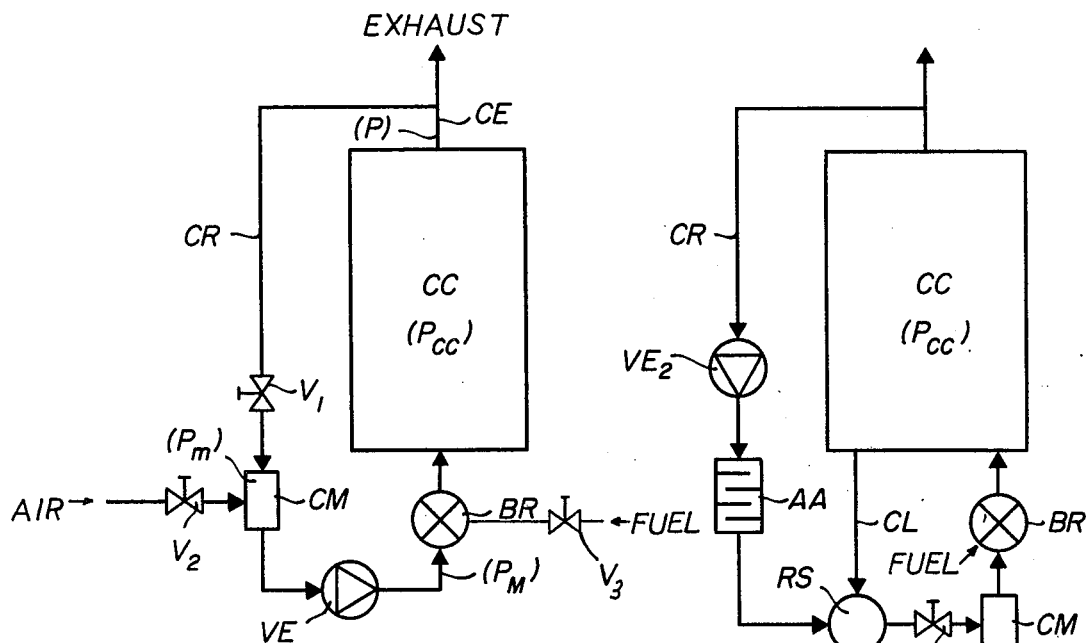
FIG. 1
FIG. 2
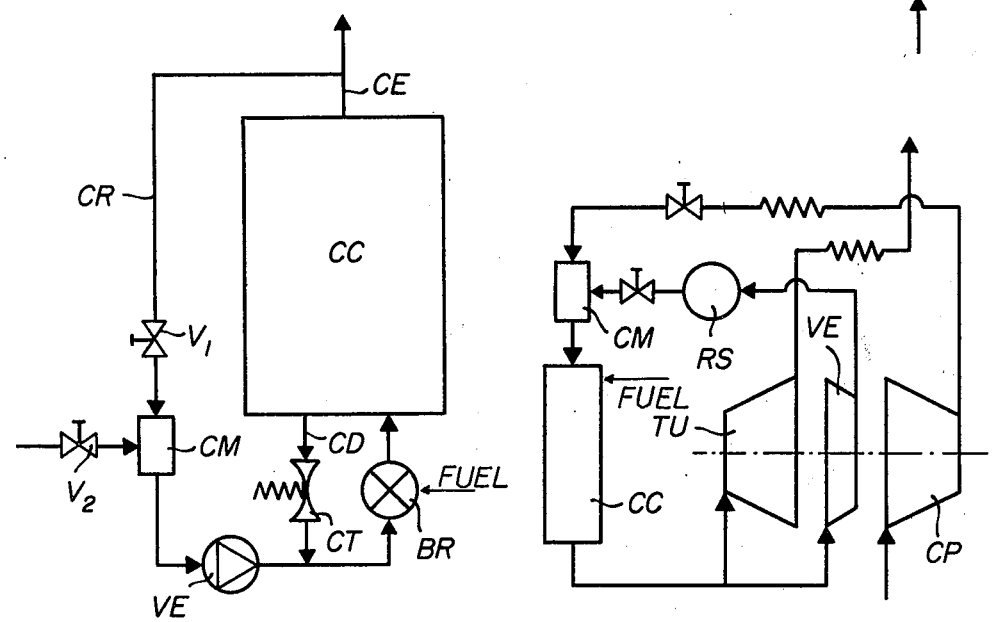
FIG. 4
FIG. 3

METHOD OF AND APPARATUS FOR CONTROLLING COMBUSTION

CROSS-REFERENCE TO RELATED APPLICATION

This application is related to the concurrently filed copending application Ser. No. 679,435 (attorney's docket No. 9586) by VOLLERIN and BAUMGARTNER, entitled PROCESS FOR MIXING TWO FLUIDS AND APPARATUS FOR CARRYING OUT THIS PROCESS.

FIELD OF THE INVENTION

The present invention relates to a method of and an apparatus for controlling operation of a combustion chamber. More particularly this invention concerns a system for feeding a combustion-sustaining gas to a combustion chamber.

BACKGROUND OF THE INVENTION

A combustion-sustaining gas and a fluid combustible (fuel) are mixed and fed under pressure to a combustion chamber where they are burned. Since combustion itself is a dynamic process it is impossible to make the combustion in the chamber perfectly stable even under ideal conditions in which a molecularly homogeneous mixture of the combustion-sustaining gas and the gaseous or finely divided fluid combustible is used.

Recirculation of the exhaust gas has been attempted in recent times in order to increase the efficiency of the system and decrease pollution created by the combustion. There are two main types of such recirculation or feedback: internal feedback which is effected purely by the shape of the combustion chamber and/or the flow of the gases or fluids in the chamber, and external feedback wherein exhaust gases drawn off the top or downstream end of the combustion chamber or from conduits connected to said combustion chamber are mixed with air and introduced under pressure back into the combustion chamber.

The main intent in such recirculation systems is to dilute the oxygen content of the air, thereby lowering the partial pressure or concentration of oxygen in the mixture of combustion-sustaining gases.

For a given mass flow it is therefore possible to greatly reduce the excess quantities of air, so as to decrease the production of nitrogen oxides and decrease the amount of soot formed.

External recirculation of combustion or exhaust gases is made through a conduit or pipe which extends from the upper end of the combustion chamber to the input of the blower that supplied air to the burner of the combustion chamber. It has been discovered that the feedback circuit causes oscillations which can build up and extinguish the flame in the combustion chamber. These oscillations are set off in the chamber and propagate through the circulation circuit. If the triggering pressure waves are at a given frequency for the system the effect is cumulative and regenerative.

For this reason external feedback has been little used, as outside of laboratory conditions it has been found to be impossible to keep the system under control. The flame is almost invariably very unstable, as the combustion produces a noise that can resonate in the feedback circuit and, when the resonance has a wavelength which is equal to or a multiple of the length of the feedback circuit it is possible for this pressure wave to amplify itself and extinguish the flame. It is noted that the noise produced at the flame is an undesirable phenomenon because it indicates a poor mixture between the combustible and the combustion-sustaining gas.

OBJECTS OF THE INVENTION

It is therefore an object of the present invention to provide an improved method of and apparatus for controlling a combustion chamber.

Another object of this invention is the provision of an improved combustion system employing external feedback of the combustion gases.

SUMMARY OF THE INVENTION

These objects are attained in a system wherein pressure oscillations are suppressed by feedback. Thus generally speeking the invention is effective each time the instability of the combustion exceeds a certain limit. There are in effect instabilities which are manifested by fluctuations of very small amplitude and relatively high frequency. These fluctuations have little effect on the combustion due to their small amplitude. On the other hand variations of greater amplitude are normally produced at frequencies which are much lower and indicate poor combustion, that is a poor mixture of the air and the combustible at the molecular level. It is therefore desirable to suppress these low-frequency oscillations independently of the existence of a recirculation circuit.

Thus, in accordance with the present invention the combustion chamber is fed with a fluid or gaseous combustible (fuel) at a generally contant rate (mass flow) for a given thermal output. The ratio of the average mass flow of the recirculate dexhaust gas to the average mass flow of the oxygen-containing gas (air, oxygen-enriched air or oxygen) is fixed and a mixture is formed of these two fluids which is fed under pressure, as the combustion-sustaining gas, into the chamber where it is burned. In accordance with the invention variations of pressure in the combustion chamber are detected and the ratio of the instantaneous above-mentioned mass flows is controlled in accordance with the detected pressure changes by increasing the ratio as the pressure change is increasing and vice versa.

According to another feature of this invention a blower or compressor operates continuously to feed the combustion-sustaining gas at a given mass-flow rate to the burner (preferably as described in the aforementioned application) to which fuel (combustible gas) is also fed at a given constant mass-flow rate. The input side of the blower is connected to a mixing chamber supplied with exhaust gas by a feedback conduit having a valve and into which ambient air may flow through another input controlled by a valve.

As pressure increases in the chamber the proportion and quantity of exhaust gases drawn in by the blower increases considerably so that the concentration of oxygen in the mixture fed into the chamber decreases, causing the pressure in the chamber correspondingly to decrease. A spontaneous decrease in pressure in the chamber will increase the proportion of air in the gases sucked in by the blower and, therefore, increase the burning in the combustion chamber and the pressure therein.

For systems having a very large combustion chamber the main bulk of the recirculated gases is withdrawn at the top of the chamber or even at the exhaust stack. The pressure changes, however, are detected within the chamber adjacent the base thereof either by means of a pressure-sensitive transducer or by means of a small-diameter tube opening into the chamber at the base. A pressure-responsive valve may be provided to open when pressure in the chamber exceeds a predetermined limit in order to feed back a great quantity of the relatively oxygen-poor exhaust gases to the burner. Alternately a slide valve or the like may be attached to the small-diameter tube in order to increase the flow of feedback gas when pressure inside the chamber exceeds the predetermined limit.

It is also within this invention to provide a system wherein an extra quantity of exhaust gas is fed into the mixing chamber whenever the pressure exceeds a predetermined limit. In these arrangements the bulk of the recirculated exhaust gas comes back through a blower and an acoustic deadener or damper so as to decrease the production of regenerative feedback waves.

BRIEF DESCRIPTION OF THE DRAWING

The above and other objects, features and advantages of the invention will become more readily apparent from the following description, reference being made to the accompanying drawing, FIGS. 1–7 of which are schematic flow diagrams of different systems in accordance with this invention.

SPECIFIC DESCRIPTION

Figure 5:
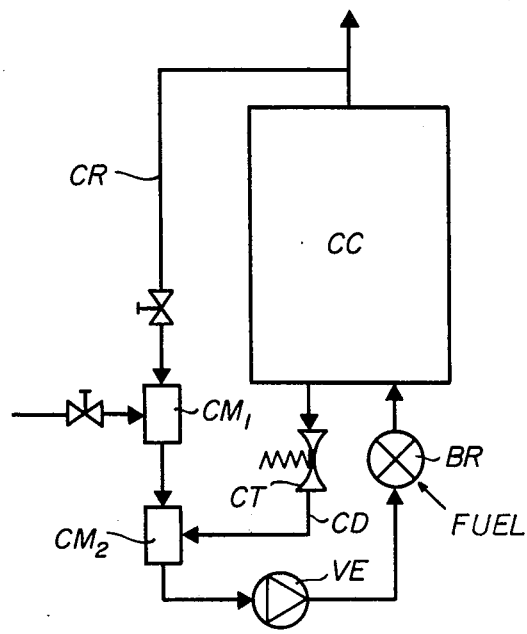

The arrangement shown in FIG. 1 has a combustion chamber CC to which is connected a burner BR fed in turn by a blower VE and by a source of fuel. The combustion chamber CC is connected to an exhaust stack or conduit CE itself connected to the input of a mixing chamber CM by a recirculating or feedback conduit CR. A valve $V_1$ establishes the flow cross section of the recirculation conduit CR and a second valve $V_2$ defines the flow cross section of an input conduit for the mixing chamber CM which is open to the air. Similarly another valve $V_3$ determines the flow cross section of the fuel feed conduit.

In accordance with the present invention the combustion is stabilized by measuring the instantaneous pressure $P_{cc}$ of the combustion chamber CC which is compared with the average pressure $\overline{P_{cc}}$ and modifying the instantaneous recirculation flow rate of the exhaust fumes from the exhaust stack CE when the instantaneous pressure $P_{cc}$ varies from the average level $\overline{P_{cc}}$ by a predetermined difference. The circulation rate is increased if the instantaneous pressure rises and is decreased if this pressure drops. If the recirculation rate is increased the proportion of oxygen in the combustion-sustaining gas blown by the compressor VE to the burner BR decreases so that the temperature of the flame in the combustion chamber CC drops as well as the instantaneous pressure $P_{cc}$. As the pressure $P_{cc}$ approaches its average value the recirculation rate R is modified so that it also will come to rest at a mean value R.

With proper choice of the parameters of the different elements of the arrangement of FIG. 1 it is possible to make these adjustment corrections automatically by completely static means.

Assuming a factor K for each valve $V_1$ and $V_2$, the instantaneous flow through them is equal to:

$$\dot{m} = K \sqrt{\Delta P_{cs}} \tag{1}$$

$\Delta P_{cs}$ being the pressure difference between the input and the output sides of the valves.

As a result of the instantaneous mass flows of exhaust gas and of air, $\dot{m}_f$ and $\dot{m}_a$, respectively are equal to:

$$\dot{m}_f = \overline{m_f} + \Delta \dot{m}_f \tag{2}$$

and $$\dot{m}_a = \overline{m_a} + \Delta \dot{m}_a \tag{3}$$

$\overline{m_a}$ and $\overline{m_f}$ being the mean mass flows and $\Delta \dot{m}_a$ and $\Delta \dot{m}_f$ being the variation with respect to these average flows.

The instantaneous recirculation rate R of combustion gases is given by the ratio:

$$R = \frac{\dot{m}_f}{\dot{m}_a} \tag{4}$$

The variations $\Delta \dot{m}_a$ and $\Delta \dot{m}_f$ relative to the average mass flows are given by the equations:

$$\Delta \dot{m}_a = - B \cdot \Delta P_m \tag{5}$$

and $$\Delta \dot{m}_f = - C \cdot \Delta P_m \tag{6}$$

$\Delta P_m$ corresponding to the minimal pressure variations of the system, that is the pressure present in the mixing chamber CM B is arrived at as follows:

$$B = \frac{\overline{m_a}}{2 \overline{\Delta P_a}} \; (>0) \text{ where } \overline{\Delta P_a} = P_{atm} - \overline{P_m} \tag{7}$$

$P_{atm}$ being atmospheric pressure.
C is arrived at as follows:

$$C = \frac{A \, B}{1 - A} \tag{8}$$

wherein $$A = \frac{\dot{m}_f}{2 \overline{\Delta P_f}} \times \genfrac{}{}{0pt}{}{(>0)}{(<0)} \text{ where } \overline{\Delta P_f} = \overline{P} - \overline{P_m} \; (>0) \tag{9}$$

$\overline{P}$ being the mean pressure in the evacuation stack CE.
In the above formulae X is arrived at as follows:

$$X = \frac{2 \overline{\Delta P_b}}{\overline{m}} - S \genfrac{}{}{0pt}{}{(>0)}{(<0)} \text{ where } \overline{\Delta P_b} = \overline{P_M} - \overline{P}, \text{ and} \tag{10}$$

$$\text{where } \overline{m} = \overline{m_f} + \overline{m_a}$$

where $\overline{P_M}$ is the maximum average pressure in the system at the output side of the blower VE.

In the above formulae S is equal to the opposite of the slope of the ventilator at the operating point on its characteristic curve, $\Delta P/\dot{m}$. Since this slope is negative, the ventilator operates in the descending part of the curve so that S is a parameter of positive sign.

Assuming that the variation pressure in the combustion chamber is positive, the fluctuation of pressure in the mixing chamber, $\Delta P_m > 0$ so that $\Delta \dot{m}_a < 0$.

Thus where $$\frac{\dot{m}_f}{\dot{m}_a} = R \quad (11),$$

$\dot{m}_a$ tends to decrease.

Therefore two different situations are possible:
1. Assuming:

$$C > 0, \Delta \dot{m}_f < 0 \quad (12),$$

it is necessary to establish whether:

$$|\Delta \dot{m}_f| > |\Delta \dot{m}_a| \quad (13)$$

as will be seen below.
2. Assuming:

$$C < 0, \Delta \dot{m}_f > 0 \quad (14)$$

R therefore increases. This corresponds to $A > 1$ or $A < 0$. The case of $A < 0$ corresponds to $X < 0$.

This increase in the instantaneous level of ratio R which is directly proportional to the proportion of recirculated exhaust fumes being fed back into the combustion chamber, causes a decrease in the intensity of combustion which correspondingly lowers the temperature of the flame. As a result the instantaneous pressure $P_{cc}$ in the combustion chamber decreases and causes R also to decrease.

The reaction time is very quick since the information is transmitted with the speed of sound. Thus if the recirculation circuit has a length of 1 meter the information is transmitted in less than 0.03 seconds, taking the temperature of the gases to be between 200° C and 250° C.

In order to analyze the situation where $C > 0$, that is where $X > 0$ it is necessary to study the effect of A.

If $C > 0$, the value of A should lie between 0 and 1. If $0 < A < 0.5$, the values of C and B are satisfactory at $C < B$ and R is increased slightly because:

$$|\Delta \dot{m}_f| < |\Delta \dot{m}_a| \quad (15)$$

If $0.5 < A < 1$, the values of C and B are satisfactory at $C > B$, and R decreases because:

$$|\Delta \dot{m}_f| > |\Delta \dot{m}_a| \quad (16).$$

The phenomenon is unstable and causes the pressure oscillations to build up until the flame is extinguished.

As has been described above, for $C < 0$, it is necessary that $A > 1$ or $A < 0$. The values of $A < 0$ correspond to $X < 0$, so that the self-correcting effect is weak. When $A > 1$, $X > 0$ so that the correcting effect is very strong. As a result the parameters $\dot{m}$ and S are given in part by the mass flow in the combustion chamber which itself is a function of the size of this chamber, of the levels of excess air and of the recirculation rate $\bar{R}$ of the combustion gas and on the other hand by the characteristic curve $\overline{\Delta P/\dot{m}}$ of the blower, the slope S being determined by the position of the operating point along this curve. This slope S is chosen to be rather strong for maximum stability of combustion independent of the phenomena associated with the recirculation circuit.

Mathematical analysis of the above formula shows that since $P_{atm}$ is a constant and since P is only slightly less than $P_{atm}$, the total mass flow $\dot{m}$ as well as the mass flow of exhaust is determinable. It is thus possible to fix the values of $\overline{\Delta P_a}$ and $\overline{\Delta P_f}$ as a function of the efficiency of the desired correcting effect for the system. It is therefore sufficient to adjust the valves $V_a$ and $V_2$ such that $\overline{\Delta P_a}$ and $\overline{\Delta P_b}$ are at the appropriate level in order to give to the terms A, B, C, and X values corresponding to the desired correcting effect.

The system as mentioned above is entirely passive. It is possible for it to establish the desired operating conditions right at the beginning by setting the valves $V_a$ and $V_2$. Thereafter wear of one part of the system has virtually no effect on its operation. As a result it is possible with the method according to the invention to attain a self-correcting and self-maintaining combustion system. This autostabilization of the combustion is obtained simply by properly dimensioning the various components and regulating the recirculation circuit so that it in no way increases the construction cost of the assembly.

The possibility of recirculating the combustion gases and automatically increasing the instantaneous level of recirculation at the same time as the pressure increases in the combustion chamber and vice versa allows external recirculation to be employed in a large industrial system. Even with an enormous installation it is possible to achieve much better stability than has hitherto been possible even in small laboratory setups.

FIG. 2 shows an arrangement similar to FIG. 1 wherein the mixing chamber is downstream of two blowers $VE_1$ and $VE_2$. A reservoir RS is provided between the blower $VE_2$ and the mixing chamber CM. The valves $V_1$ and $V_2$ are respectively provided between the blower $VE_2$ and the chamber CM and between the blower $VE_1$ and the chamber CE. An acoustic damper AA is provided between the blower $VE_2$ and the reservoir RS.

A liaison conduit CL of much smaller flow cross-section than the recirculation conduit CR is connected between the reservoir RS and the bottom of the combustion chamber CC.

The blowers $VE_1$ and $VE_2$ and the valves $V_1$ and $V_2$ are dimensioned and adjusted in order to obtain the desired ratio R of average mass flows of exhaust and air. The acoustic damper serves to prevent pressure fluctuations from being transmitted from the chamber CC to the reservoir RS so that the reservoir RS only receives pressure variations through the small-diameter conduit CL. Thus if the instantaneous pressure $P_{cc}$ of the chamber CC rises the pressure also rises in the chamber CM and in the reservoir RS. Working against this increased pressure forces the blower $VE_1$ to push the air through with greater pressure, causing its operating point to move along its characteristic curve $\overline{\Delta P/\dot{m}}$ so as to reduce its mass of flow. Since the pressure in the reservoir changes at the same time as in the chamber CM it is easy to see that the ratio $\bar{R}$ raises the necessary degree as long as the pressure drops along the valves $V_1$ and $V_2$ are correctly set in accordance with the above-given mathematical analysis.

The advantage of this operating mode using separate conduction of the combustion gas and the information is that in extremely large installations it is possible to reduce the response time to a minimum while with-drawing the feedback gas from a location relatively remote from the burner. Thus the information will remain relatively in phase with the phenomenon it serves to correct. If the information is slowed down too much the lag in response time might well cause the system to respond in the exact opposite manner to the desired one. Providing a very short connecting conduit CL largely eliminates this by cutting the response time to an absolute minimum; similarly, the acousting damper AA prevents the circulation pulses from being thrown off by a shock wave transmitted through the recirculation conduit CR to the reservoir RS.

The arrangement shown in FIG. 3 has a blower VE carried on the shaft of a turbine TU to which is fed exhaust gas from the combustion chamber CC. In addition an air compressor CP on the turbine shaft has its output connected through a valve to the mixing chamber CM. A reservoir RS is connected between the output of the ventilator VE and the mixing chamber CM. With this system as the pressure in the chamber CC increases the turbine TU operates with increased speed to increase the input of exhaust gas into the chamber CM. It also causes the compressor CP to turn at increased speed, but proper balancing of the system insures that the arrangement will be self-correcting as described above.

It is also possible in accordance with this system to use active control means as shown in FIG. 4. Here the same structure is used as in FIG. 1, but a conduit CD provided with a pressure-responsive valve CT is provided between the bottom of the combustion chamber CC and the conduit between the blower VE and the burner BR. When the pressure inside this combustion chamber CC exceeds a predetermined limit the valve CT opens and feeds a quantity of high-pressure exhaust gas to the burner BR, automatically quenching the flame to a limited extent.

The system shown in FIG. 4 is particularly useful in large heating systems where the starting-up pressure is very great but the running pressure remains relatively even. Thus when the fuel is ignited the valve CT will open until the system starts to run properly whereupon it will close and the self-regulation described above with reference to FIG. 1 will take over.

FIG. 5 shows a system similar to that of FIG. 4 but wherein the extra gas is injected into a secondary mixing chamber $CM_2$ slightly downstream of the primary mixing chamber $CM_1$. Such an arrangement mixes the exhaust fumes much better with the air in the combustion-sustaining gas fed to the burner by the blower VE.

In all the arrangements described above the self-regulation of the combustion process is obtained by proper choice of the various parameters so as to vary the recirculation rate R according to the Rayleigh method. It is necessary that in one oscillation cycle $$\oint H P \, dt < 0 \qquad (17)$$

Figure 6:
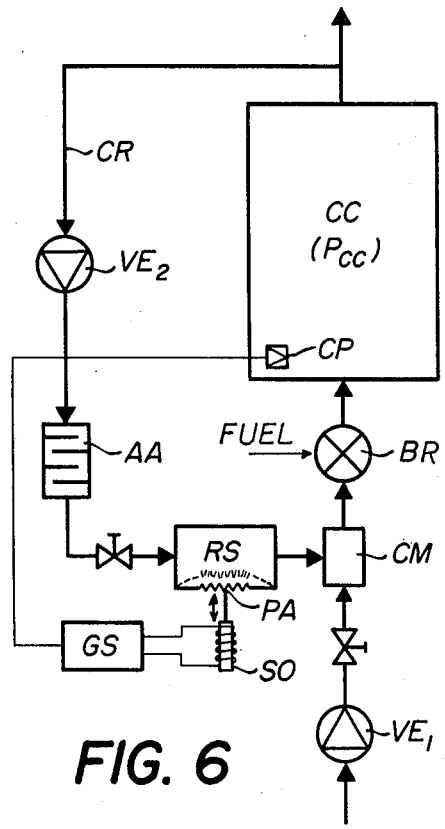

It is also possible as shown in FIG. 6 to use active means in an arrangement similar to that of FIG. 2. Here a piezoelectric transducer CP is fitted in the bottom of the chamber CC and is connected to a signal generator GS having a solenoid SO that coacts with a deformable wall PA of the reservoir RS.

In this system when the transducer CP gives an output which exceeds a predetermined limit the signal generator operates the solenoid so as to push in the wall PA and increase the proportion of exhaust gas fed to the chamber CM. When the transducer CP gives a response to the other side of a predetermined range the wall PA is pulled out by the solenoid SO to increase the proportion of air in the combustion-sustaining gas fed to the burner BR.

Figure 7:
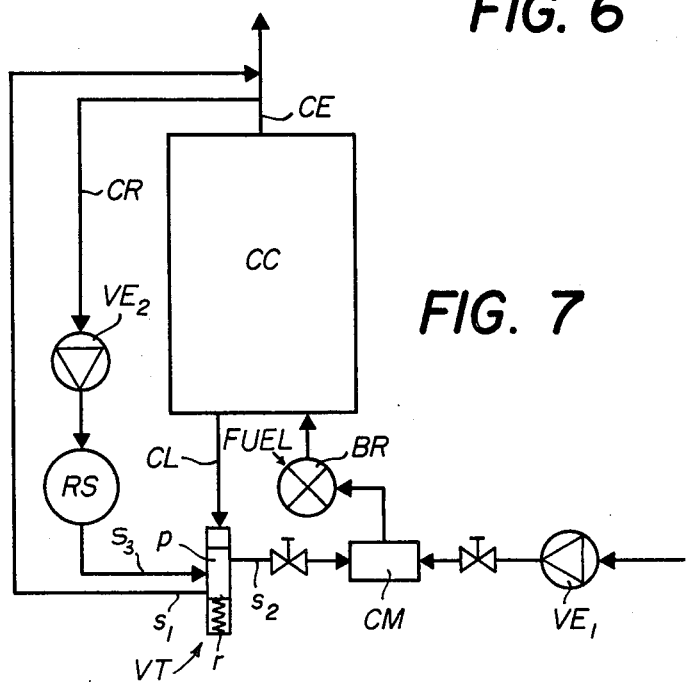

The system of FIG. 2 can also be varied as shown in FIG. 7 by connecting one input $s_1$ of a slide valve VT to the exhaust conduit CE, connecting another input $s_3$ to the reservoir RS, and connecting the output $s_2$ to the chamber CM. This slide valve VT has a piston $p$ displaced in one direction by a compression spring $r$ and in the other direction by pressure from a liaison conduit CL connected to the bottom of the chamber CC. When the pressure in the chamber lies well below a predetermined limit there is no flow through the valve VT so that only air is fed to the burner BR. Once the pressure exceeds a predetermined lower threshold the inlet $s_1$ is uncovered and flow between the reservoir RS and chamber CM through the blower $VE_2$ is possible for normal operating conditions and standard regulation. When the pressure exceeds a predetermined threshold the inlet $s_1$ is uncovered and flow between the outlet conduit CE and the valve outlets $s_2$ is possible so as to feed a great quantity of gas into the chamber CM and greatly reduce the percentage of oxygen in the combustion-sustaining gas fed to the burner BR.

In all of the embodiments, the mixing chamber CM, $CM_1$, $CM_2$ can have the configuration of the device described in the copending application mentioned above.

I claim:
1. A method of operating a combustion chamber comprising the steps of:
    feeding a fluid combustible with a combustion-sustaining gas to said chamber and burning said combustible therewith to form an exhaust gas in said chamber mixing a recirculated portion of said exhaust gas with an oxygen-containing gas to form said combustion-sustaining gas and feeding the mixture underpressure into said chamber;
    establishing a predetermined normal ratio between the mass-flow rate of said exhaust gas and the mass-flow rate of said oxygen-containing gas,
    continuously detecting pressure in said chamber; and
    increasing said ratio on surging of the pressure in said chamber and decreasing said ratio on recession of said pressure.
2. The method defined in claim 1, further comprising the steps of:
    maintaining said chamber under superatmospheric pressure;
    maintaining the mass-flow rate of said combustible to said chamber generally constant;
    mixing ambient air with the exhaust gas from said chamber for use as said combustion-sustaining gas; and
    increasing said ratio by increasing the quantity and the proportion of exhaust gas in said combustion-sustaining gas on surging of pressure in said chamber and vice versa, whereby on increase of said ratio said combustion-sustaining gas becomes less rich in oxygen.
3. The method defined in claim 2, further comprising the steps of independently compressing said exhaust gas and ambient air prior to mixing thereof.
4. The method defined in claim 2, further comprising the step of greatly augmenting the quantity of exhaust gas mixed with said ambient air upon the pressure in said chamber exceeding a predetermined limit.

5. The method defined in claim 4, further comprising the steps of pressurizing a reservoir with said exhaust gas so that the pressure in said reservoir is superior to and largely independent of said pressure in said chamber, and employing the compressed exhaust gas from said reservoir for mixing with said ambient air in the formation of said combustion-sustaining gas.

6. A combustion apparatus comprising:
a pressurizable combustion chamber;
a burner connected to said chamber;
means for feeding a gaseous combustible to said burner;
means for mixing exhaust gas derived from said combustion chamber with an oxygen-containing gas to form a combustion-sustaining gas, the mass flow of said exhaust gas and the mass flow of said oxygen-containing gas being in a certain ratio;
means for feeding said combustion-sustaining gas to said burner for mixture with said combustible and introduction into said chamber, whereby said mixture is burned in said chamber to create therein a superatmospheric varying pressure;
means for detecting pressure in said chamber; and
means for increasing said ratio on detection of a pressure surge and for decreasing said ratio on a recess of said pressure.

7. The apparatus as defined in claim 6 wherein the last-mentioned means and said detection means includes a feedback conduit connected between said chamber and said mixing means, said mixing means being a chamber having an inlet for receiving ambient air, whereby said combustion-sustaining gas is a mixture of exhaust gas conveyed by said conduit to said mixing chamber and ambient air.

8. The apparatus defined in claim 7, further comprising a compressor and a reservoir in said conduit downstream of said compressor, said last-mentioned means including means for rapidly increasing pressure in said reservoir on surging of pressure in said combustion chamber and for decreasing pressure in said reservoir on pressure receding in said combustion chamber.

9. The apparatus defined in claim 7 wherein said last-mentioned means includes a valve connected directly between said combustion chamber and said mixing means, said valve opening on pressure in said combustion chamber exceeding a predetermined limit.

10. The apparatus defined in claim 7 wherein said means for detecting includes an electronic pressure transducer.

* * * * *